(12) United States Patent
Aoshima et al.

(10) Patent No.: US 6,647,127 B1
(45) Date of Patent: Nov. 11, 2003

(54) METHOD OF MANIPULATING IMAGE DATA AND A RECORDING MEDIUM FOR RECORDING A PROCESSING PROGRAM THEREOF

(75) Inventors: Hirokazu Aoshima, Yokohama (JP); Tsukasa Saitou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/518,687

(22) Filed: Mar. 3, 2000

(30) Foreign Application Priority Data

Jan. 27, 2000 (JP) ........................................ 2000-018138

(51) Int. Cl.[7] ................................................ G06K 9/00
(52) U.S. Cl. ..................................... 382/100; 357/240.3
(58) Field of Search ................................. 382/100, 256, 382/243, 239, 190, 298, 164, 166, 167, 236, 237, 250, 251; 375/240.3, 240.16; 345/420, 426; 386/70; 348/700; 357/240.03, 240.15

(56) References Cited

U.S. PATENT DOCUMENTS

| | | | | |
|---|---|---|---|---|
| 5,510,840 A | * | 4/1996 | Yonemitsu et al. | 375/240.15 |
| 5,539,466 A | * | 7/1996 | Igarashi et al. | 375/240.15 |
| 5,748,789 A | * | 5/1998 | Lee et al. | 382/243 |
| 5,949,953 A | * | 9/1999 | Shirakawa et al. | 386/70 |
| 6,094,234 A | * | 7/2000 | Nonomura et al. | 348/700 |
| 6,438,167 B1 | * | 8/2002 | Shimizu et al. | 375/240.03 |

FOREIGN PATENT DOCUMENTS

JP 10-108180 4/1998

OTHER PUBLICATIONS

"JPEG still image data compression standard", by William B. Pennebaker, and Joan L. Mitchell, pp. 97–134.

* cited by examiner

*Primary Examiner*—Jayanti K. Patel
*Assistant Examiner*—Seyed Azarian
(74) *Attorney, Agent, or Firm*—Mattingly, Stanger & Malur, P.C.

(57) ABSTRACT

An image data manipulation method and a recording medium for recording a processing program thereof are disclosed. A block to be manipulated is read out of the image data, and the DC component value of at least one of the luminance information and the color information is changed for each block, and the ID information for identifying the changed block is attached to the image data containing the particular block, thereby controlling the manner of display of the image data for each block.

7 Claims, 8 Drawing Sheets

METHOD OF MANIPULATING IMAGE DATA AND A RECORDING MEDIUM FOR RECORDING A PROCESSING PROGRAM THEREOF

BACKGROUND OF THE INVENTION

The present invention relates to a technique of manipulating image data in which the image data is scrambled by the use of a computer and restored to the original image data by removing the scramble from the image data, or in particular to an image data manipulating method suitable for combining a plurality of types of image data manipulation and also for manipulating image data with a small amount of processing, and a recording medium for recording a processing program of such an operation.

One of the image data formats handled by computer is JPEG (Joint Photographic Coding Expert Group) which finds wide applications. The JPEG format is described, for example, in "JPEG still image data compression standard", by William B. Pennebaker, and Joan L. Mtchell, pp.97–134. There are several types of JPEG formats, of which JFIF (JPEG File Interchange Format) is most widely used.

In JFIF, the YCbCr color coordinate system is used for expression of a color image, in which the color of each pixel is expressed by the luminance component (Y), the difference between luminance and blue level (Cb) and the difference between luminance and red level (Cr). Each component has 256 gradations per pixel.

Also, in JFIF, an image is segmented into rectangular areas each having a predetermined number of pixels in vertical and horizontal directions, each rectangular area is subjected to discrete cosine transform (hereinafter referred to as DCT), and the image is expressed by the DCT coefficient obtained as the result of DCT. These rectangular areas are called blocks. In JFIF, the basic size of a block is assumed to contain eight pixels in each of vertical and horizontal directions. The DCT coefficient corresponding to this block assumes a value representing eight rows and eight columns. One DC component value and 63 AC component values are obtained for each element of each block.

The DC component value indicates a value constituting a reference of each of a luminance component value and a color component value of each block, while the AC component value indicates the degree of change in the block with respect to the reference value.

Further, for each value (DC component value and AC component value), information is reduced by quantization using a quantization table. Specifically, the quantization table is a table as large as the DCT coefficient, and the quantization is effected by dividing the value of a DCT coefficient by a corresponding value in the quantization table.

Information for each DC component value and each AC component value is also reduced by removing some sampling pixels, run-length compression and Huffman coding, which are not directly related to the present invention and will not be described.

The blocks are managed sequentially. In JFIF, the DC component value of each block may be expressed not by a real value but by the difference of the DC component value with that of an adjoining block. Specifically, the DC component value of a given block is expressed by the difference of the DC component value thereof with an adjoining block. This utilizes the image data characteristic that the luminance component values and the color component values of adjoining images are often analogous to each other. The information is reduced in this way.

A conventional method in which an image is changed (scrambled) by computer processing is described, for example, in JP-A-10-108180. In this technique, the image can be scramble to obtain "a monochromatic image unchanged from the original image", "an image having blurred details" or "an image of inserted data superposed on the original image". Also, an image scrambled can be restored to the original image by decoding.

This image scrambling process in which the image data is changed in advance and the original image is obtained only through a regular procedure has come to be used for the purpose of protecting the copyright of image data.

As for the image data manipulation, one practice is to bury information in the image data by use of the electronic watermarking technique. The electronic water-marking is performed by manipulating predetermined information of the image data like the image scramble, and therefore may not be used in combination in the case where the information to be manipulated for change are overlapped between the two techniques, and also in the arts of JP-A-10-108180.

The problem of the prior art to be solved is the fact that the combined use of the electronic watermarking and the image scramble is impossible in the case where the information to be manipulated is overlapped in manipulating image data and the fact that the processing amount is increased as the image is scrambled over the whole area of the image.

SUMMARY OF THE INVENTION

The object of the present invention is to solve the problems of the prior art and to provide an image data manipulation method capable of sophisticated, fast image data manipulation with a combination of plural types of image data manipulation processes and a recording medium for recording a processing program thereof.

In order to achieve the object described above, according to the present invention, there is provided an image data manipulation method using a computer having a central processing unit and a storage unit, wherein an image is segmented into a plurality of blocks each having a predetermined number of pixels along each of vertical and horizontal directions and thus converted into image data having luminance information and color information thereby to scramble the image data, the method comprising the steps of:

reading a designated block from the image data stored in a storage unit;

changing at least one of the luminance information and the color information of each block thus read out, by the central processing unit; and attaching the ID information for identifying the block thus scrambled to the image data including the particular block thereby to control the manner in which the image data are displayed for each block.

In the case where the image data are transformed by the discrete cosine transform (DCT) of the pixel value of a block, for example, the DC component value of the luminance information and the color information of the DCT result for each block. In such a case, a predetermined bit value of the DC component of each block is used as ID information. A scramble is indicated, for example, by setting the least significant bit to "1". Alternatively, whether a particular block has been scrambled or not is indicated by the header information of a data format.

As described above, the manner in which image data is displayed is changed for each block, and therefore the area for which the manner of display is changed can be limited to specified blocks, thereby reducing the amount of manipulation for scramble. At the same time, since the information to be changed is limited, other image data manipulation techniques such as the electronic watermarking can be used in combination.

The blocks specified as scramble blocks by the ID information are transformed to restore the image data by a procedure reverse to the scramble.

Further, in the case where the display conditions fail to be met in the procedure for restoring the image data after verification and checking of the display conditions, either the image data are displayed without being restored or nothing is displayed. In this way, the manipulator can easily determine by watching the image on display whether the display conditions have been correctly verified or not.

According to the invention, the image can be scrambled for each block, and therefore the electronic watermark can be buried in the image portions not scrambled. Also, the processing amount can be reduced as compared with the case in which the whole area of the image is scrambled. Thus, a sophisticated, fast image data manipulation is possible with a plurality of types of image data manipulation processes combined.

DESCRIPTION OF THE EMBODIMENTS

Embodiments of the present invention will be described in detail below with reference to the accompanying drawings.

Figure 1:
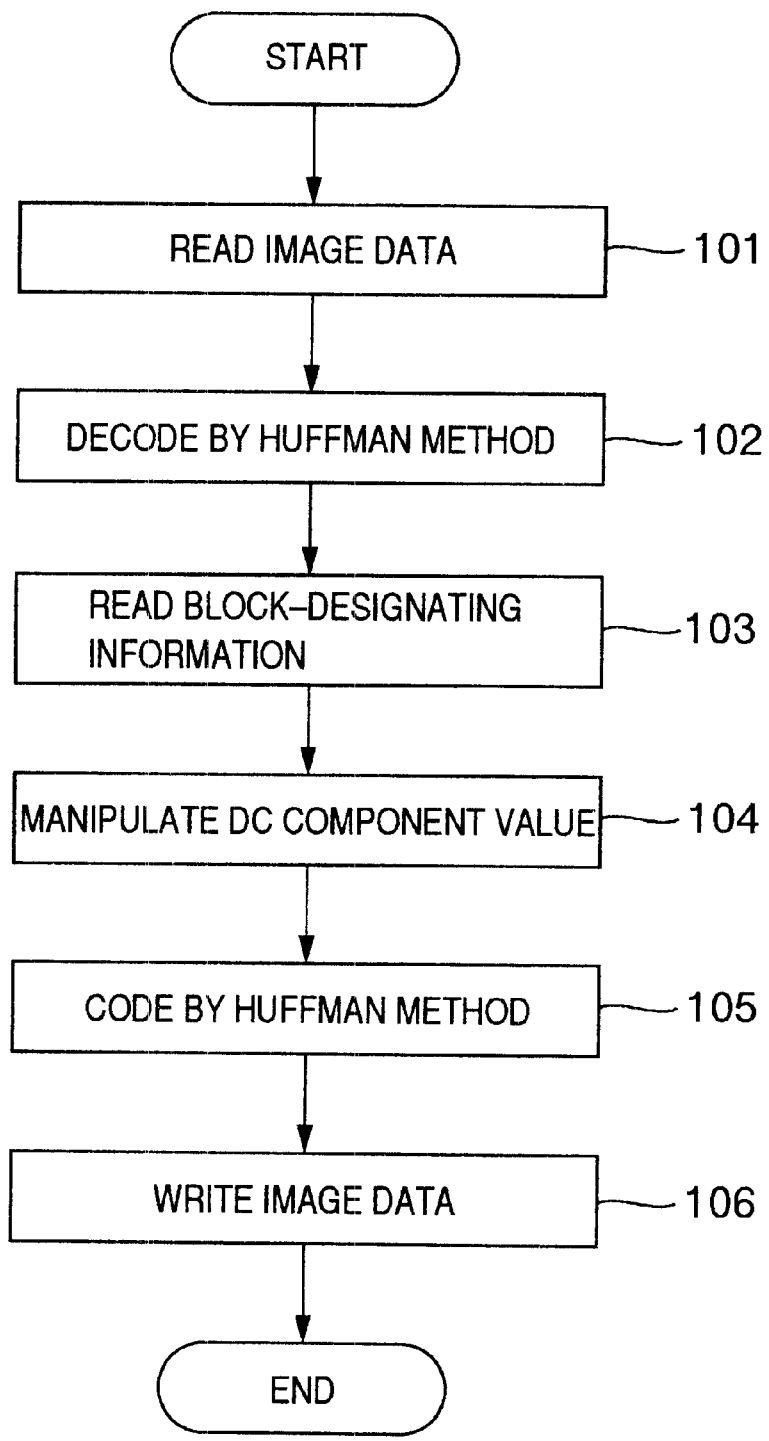
FIG. 1 is a flowchart showing a first example of a processing operation in an image data manipulation method according to the present invention.
Figure 2:
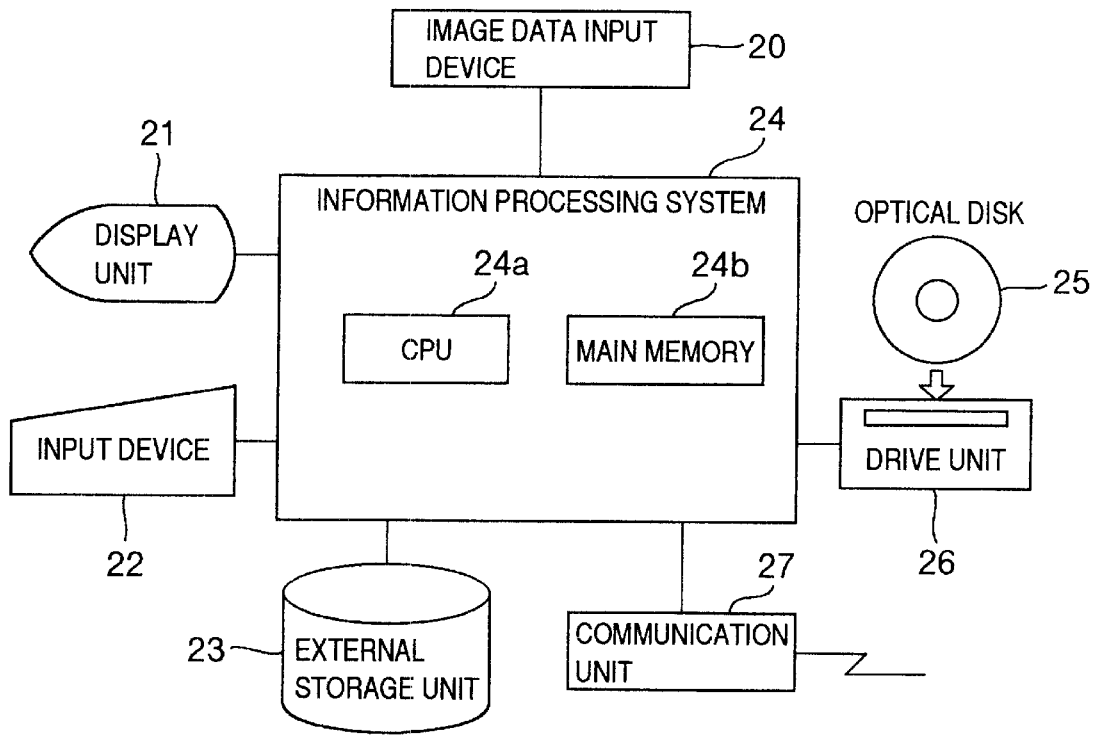
FIG. 2 is a block diagram showing an example configuration of a computer system for performing the processing operation shown in FIG. 1.

FIG. 1 is a flowchart showing a first example of the processing operation in an image data manipulation method according to the invention. FIG. 2 is a block diagram showing an example configuration of a computer system for performing the processing operation of FIG. 1.

In FIG. 2, reference numeral 20 designates an image data input device for inputting image data to be manipulated, through a scanner or the like, numeral 21 a display unit including a CRT (cathode ray tube) or a LCD (liquid crystal display), numeral 22 an input device including a keyboard or a mouse, numeral 23 an external storage unit including a hard disk or the like for recording the image data input from the image data input device 20 or the like, numeral 24 an information processing system having a CPU (central processing unit) 24a and a main memory (main storage unit) 24b for computer processing, numeral 25 an optical disk constituting a recording medium for recording a processing program and data according to the invention, numeral 26 a drive unit for performing the read operation of the optical disk 25, and numeral 27 a communication unit used for transmission, etc. of the image data manipulated.

With the computer system according to this embodiment, the manipulated image data can be written on a writable optical disk by the drive unit 26. Also, the image data to be manipulated can be input from the optical disk. Further, in the computer system according to this embodiment, the image data to be manipulated can be input from other computer systems through a communication line such as the internet or the LAN (Local Area Network) by the communication unit 27. Further, the image data manipulated can be transmitted to other computer systems.

The processing program and the data recorded in the optical disk 25 are installed in the external storage unit 23, read into the main memory 24b and executed by the CPU 24a. In this way, the processing according to the invention shown in FIG. 1 is performed by the information processing system 24.

An application of the image data manipulation method according to the invention to the JFIF image data will be explained below with reference to the case of FIG. 1 in which the DC component value of the luminance distribution of each JFIF block is manipulated.

In step 101 of FIG. 1, the image data to be manipulated are read from the external storage unit 23 of FIG. 2, and the format of the image data is analyzed and stored in the main memory 24b.

In step 102, the image data stored in the main memory 24b are decoded by Huffman method, and the value thereof is obtained for each block. For the blocks of which the DC component value is expressed by the difference with the DC component value of an adjoining block, the difference is converted to the expression with a real value and then decoded. These processing are performed according to the JFIF specification.

Figure 3:
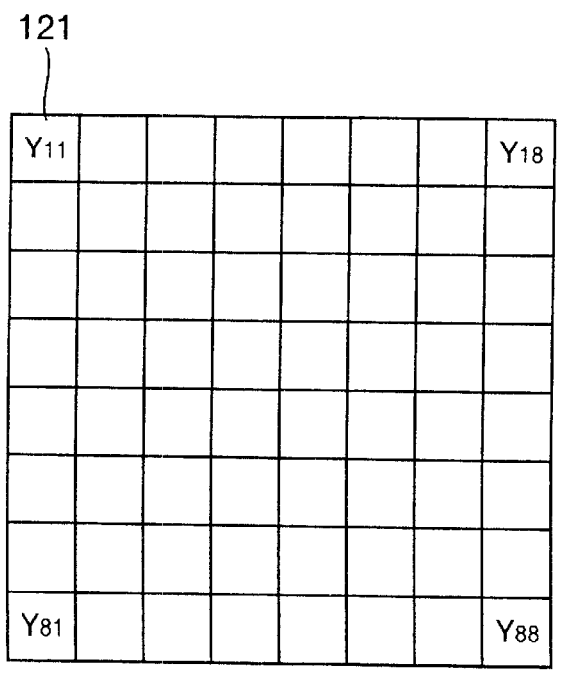
FIG. 3 is a diagram for explaining a configuration example of a luminance information table of the image data to be manipulated.

The luminance information of a block which has been subjected to Huffman decoding in step 102 is comprised of integral values expressed as a table having eight rows and eight columns (8×8 table) as shown in FIG. 3.

FIG. 3 is a diagram for explaining a configuration example of a luminance information table for the image data to be manipulated.

In FIG. 3, the information 121 on the first row on the first column (described as Y11 in FIG. 3) is a DC component value, and the remaining 63 pieces of information constitutes the AC component value. The luminance information expressed in this table are available in the number equal to the number of blocks and arranged in the same order as the blocks.

Then, in step 103 shown in FIG. 1, the information designating the blocks to be manipulated is read from the external storage unit 23 of FIG. 2. This information is a bit string including at least a bit "1" indicating a block to be manipulated and at least a bit "0" indicating a block not to be manipulated, arranged in the same order as the blocks.

Figure 4:
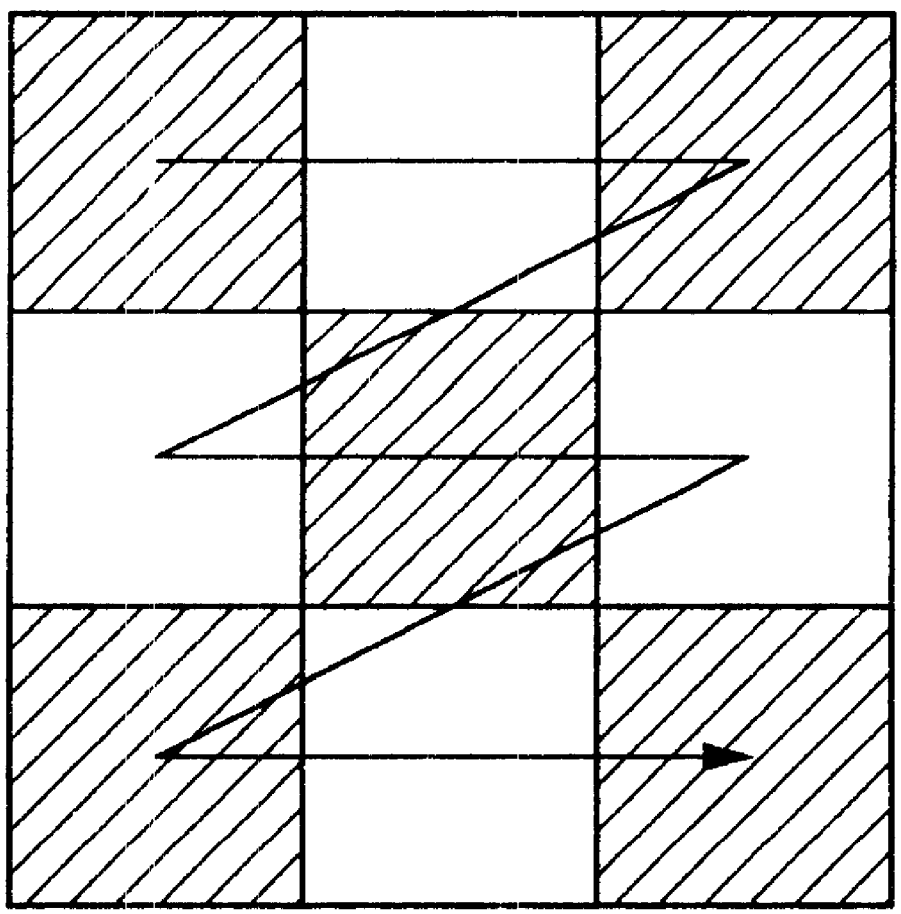
FIG. 4 is a diagram for explaining an example of designation of a block to be manipulated.

FIG. 4 is a diagram for explaining an example designating the blocks to be manipulated.

In the case shown in FIG. 4, the blocks hatched in the image having three blocks each in horizontal and vertical direction are to be manipulated. In this case, the information designating the blocks to be manipulated is given as 101010101 in the order indicated by arrow. In recording a bit string on the format, the extraneous data area are filled with bits 1 or 0 to the boundary of a byte. This information may be compressed and recorded.

Although the information designating the blocks to be manipulated is read from the external storage unit 23 of FIG. 2 in the above-mentioned case, other methods can also be used. For example, such information can be input from the input device 22, or the image to be manipulated is displayed on the display unit 21 and by operating the graphical user interface on the image thus displayed, the blocks to be manipulated can be designated from the input device 22.

In step 104 of FIG. 1, the DC component value is manipulated as shown in (a) to (c) below for each block to be manipulated, designated by the information read in step 103.

The DC component value is changed in such a manner as to secure a change thereof by at least a predetermined value from the original value thereof. Specifically, a change of 32 or more produces the scramble effect. The larger the change, the larger the scramble effect.

According to this invention, the scramble effect is produced in the designated blocks so that bright gray is changed to dark gray, dark gray to bright gray, white to black, and black to white.

(a) First, in the case where the DC component value of a block to be manipulated (the information 121 in FIG. 3) is not less than a threshold value A, or less than a threshold value B (B<A), the DC component value is multiplied by "−1" and after thus reversing the plus and minus signs, a predetermined value E is subtracted.

(b) In the case where the DC component value is less than the threshold value A and not less than the threshold value C (B<C<A), a predetermined value D is subtracted from the DC component value.

(c) In the case where the DC component value is less than the threshold value C and not less than the threshold value B, the predetermined value D is added to the DC component value.

Assume that the threshold value C is set to "0", the value E to "1", and the difference between the threshold value A and the threshold value C, the difference between the threshold value C and the threshold value B and the value D are set equal to each other. Then, the value after conversion can be converted inversely. In such a case, the data associated with (b) above are converted into the data associated with (c) above, while the data associated with (c) are converted into the data associated with (b).

An explanation will be given specifically below of the case in which the threshold value A is set to "128", the threshold value B to "−128", the threshold value C to "0", the threshold value D to "128", and the threshold value E to "1".

In the case where the DC component value is "200", for example, the case of (a) described above is involved, and therefore the DC component value is converted to "−201".

In the case where the DC component value is "120", on the other hand, the case (b) above is involved, and therefore the DC component value is converted to "−8". In the case where the DC component value is "16", the case (b) is involved and therefore the DC component value is converted to "−112". In the case where the DC component value is "0", on the other hand, the case (b) above is involved, and therefore the DC component value is converted to "−128". In the case where the DC component value is "−10", the case (c) is involved and therefore the DC component value is converted to "−118". In the case where the DC component value is "−110", on the other hand, the case (c) above is involved, and therefore the DC component value is converted to "18". In the case where the DC component value is "−200", the case (a) is involved and therefore the DC component value is converted to "199".

As the result of this operation, the DC component value to be manipulated is changed by at least 128 from the original value. Consequently, in the case where the reference luminance of the block to be manipulated is approximate to the reference luminance of the surrounding blocks, the luminance of the block manipulated in the aforementioned operation is considerably deviated from the reference luminance of the surrounding blocks. If the block is displayed as it is, therefore, it is easily understood that the image data is changed.

Then, in step 105 of FIG. 1, the converted data is subjected to Huffman coding process. In the process, the blocks the value of which has been expressed by the difference are converted to the expression with a real value before Huffman coding.

The image data stored in the main memory 24*b* in step 101 and processed in step 105 with the corresponding portion thereof rewritten is stored in the external storage unit 23 in step 106 of FIG. 1.

In the process, the information specifying the blocks of which the DC component is manipulated is added to the image data as an application data segment specified in JFIF. The application data segment corresponds to the header information of the data format of the image data. The information indicating the blocks of which the DC component value is manipulated is the information read in step 103 designating the blocks to be manipulated. Sixteen application data segments are available according to JFIF specification. In the case under consideration, it is assumed by way of explanation that the information of the bit string "101010101" described with reference to FIG. 4 is inserted in the data segment of APP1 which is one of the sixteen application data segments, although other application data segments can be used alternatively.

As the result of the foregoing process, the image data manipulation is completed and the image data manipulated are recorded in the external storage unit 23 or the optical disk 25. Also, the image data are transmitted to other computer systems from the communication unit 27 through the internet or the LAN.

Now, an explanation will be given of the image data restoration operation performed in the case where the image data recorded in the optical disk 25 or transmitted through the communication unit 27 are displayed on other computer systems.

Figure 5:
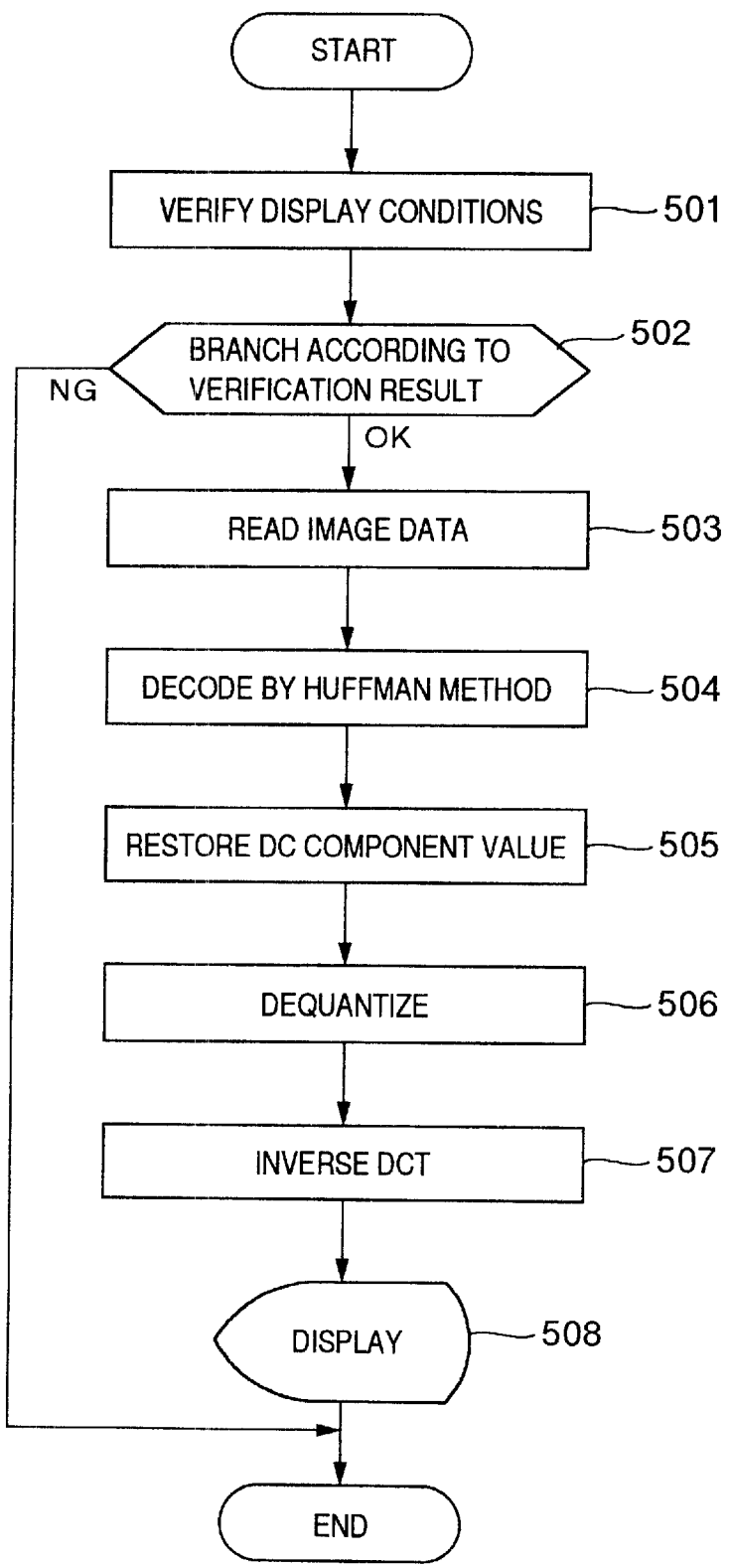
FIG. 5 is a flowchart showing a second example of the processing operation in an image data manipulation method according to the invention.
Figure 6:
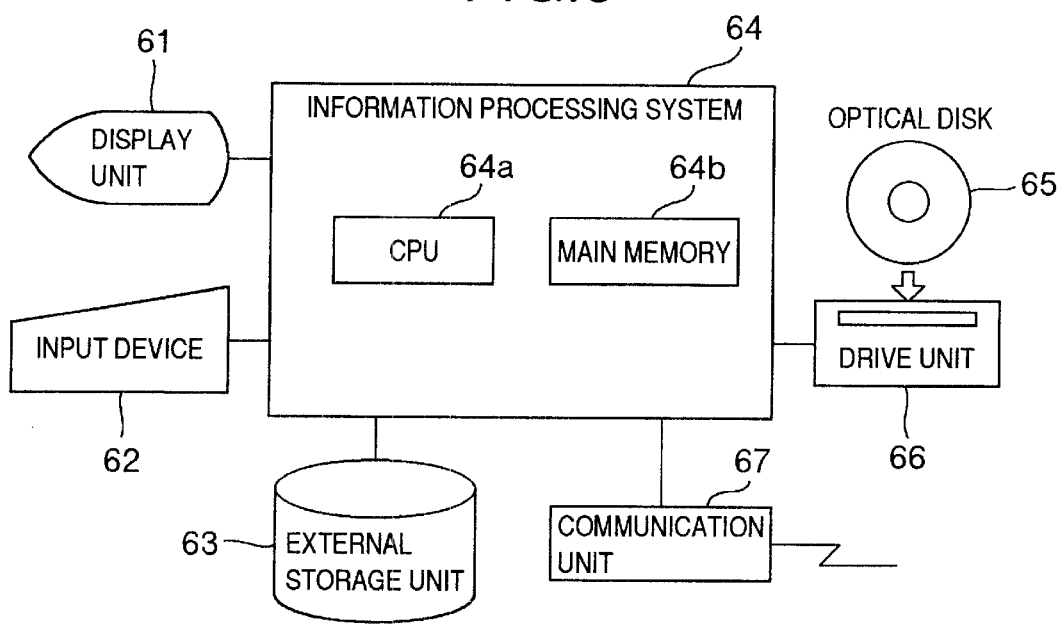
FIG. 6 is a block diagram showing a configuration example of a computer system for performing the processing operation shown in FIG. 5.

FIG. 5 is a flowchart showing a second example of the processing operation in an image data manipulation method according to the invention. FIG. 6 is a block diagram showing a configuration example of a computer system for performing the processing operation of FIG. 5.

The computer system shown in FIG. 6 includes a display unit 61, an input device 62, an external storage unit 63, an information processing system 64, an optical disk 65, a drive unit 66 and a communication unit 67. This configuration is similar to that of the computer system shown in FIG. 2 except that the image data input device 20 is not included. Nevertheless, the image data input device 20 may be included in this configuration.

The processing program and the data recorded in the optical disk 65 are installed in the external storage unit 63, read into the main memory 64b 903 and executed by the CPU 64a. In this way, the information processing system 64 executes the process according to the invention shown in FIG. 5.

Now, an explanation will be given of the restoration operation of the image data which are fetched into the external storage unit 63 through the optical disk 65 or the communication unit 67 and of which the DC component value of the luminance distribution in each JFIF block is manipulated by the process shown in FIG. 1 in the computer system of FIG. 2.

In step 501 of FIG. 5, the display conditions are verified by checking whether the information permitting the user to display is recorded in the external storage unit 63 of FIG. 6 or not. The verification of the display conditions is not limited to the checking as to whether the information indicating the permission of display is recorded or not in the external storage unit 63 as described above, but may include other techniques such as the verification by a device connected in advance for producing a response as to whether a predetermined amount is paid or not or the verification as to whether the display conditions buried as an electronic watermark in the image are met or not.

In step 502, the process branches according to the result of verification in step 501. Specifically, in the case where the verification is successful in step 501, the process proceeds to step 503 for restoration operation, while in the case where the verification fails in step 501, the process is terminated. In the case where the verification fails, the image may be displayed as it is without performing the restoration operation on the image data manipulated in the computer system shown in FIG. 2.

In step 503, the image data to be restored is read from the external storage unit 63 shown in FIG. 6, and recorded in the main memory 64b by analyzing the format thereof.

In step 504, the image data recorded in the main memory 64b is decoded by Huffman method thereby to obtain a value for each block.

Also, in step 504, as in step 102, the blocks of which the DC component value is expressed as the difference with the DC component value of an adjoining block are converted to an expression with a real value.

These processes are specifically performed based on the JFIF specification.

The luminance information of the blocks subjected to Huffman decoding in step 504 is constituted of integral values expressed as an 8×8 table as shown in FIG. 3.

In step 505, the operation of restoring the DC component value for each block is performed in the manner described in (a') to (c') below based on the information designating the blocks to be manipulated, obtained from the application data segment.

(a') First, in the case where the DC component value of a block to be manipulated (the information 121 in FIG. 3) is not less than a threshold value A or less than a threshold value B (B<A), the DC component value is multiplied by "−1" and after reversing the plus and minus signs, a predetermined value E is subtracted.

(b') In the case where the DC component value is less than the threshold value A and not less than a threshold value C (B<C<A), a predetermined value D is subtracted from the DC component value.

(c') In the case where the DC component value is less than the threshold value C and not less than the threshold value B, the predetermined value D is added to the DC component value.

The aforementioned operation is the same as the operation in step 104 shown in FIG. 1, and by using the same threshold values A, B, C, D, E as the corresponding ones in step 104, the operation reverse to that of step 104 is accomplished, thereby making it possible to restore the original DC component value.

Specifically, the data associated with the condition (b') above corresponds to the condition (c) before the execution of step 104 in FIG. 1, and the data associated with the condition (c') above corresponds to the condition (b) before the execution of step 104 in FIG. 1.

Then, in step 506 of FIG. 5, the dequantization is performed, and in step 507, the inverse DCT is executed. The detail of these processes is based on the JFIF specification.

The aforementioned process can produce the value of each pixel of the image information. In step 508, an image is displayed on the display unit 61 of FIG. 6 using the value of each pixel thus obtained. This image is already restored to the original image.

Although the application data segment contains the information designating the blocks to be manipulated according to this embodiment, other techniques can alternatively be used. For example, the information designating the blocks to be manipulated is buried as an electronic watermark in the image data. As another alternative, a changed block is designated by a predetermined bit value of the DC component of the block.

Now, an explanation will be given of a technique for recording the information indicating a block of which the value is manipulated, by a predetermined bit value of the DC component of the block.

First, the scramble processing by the computer system shown in FIG. 2 will be explained with reference to FIG. 7A.

Figure 7A:
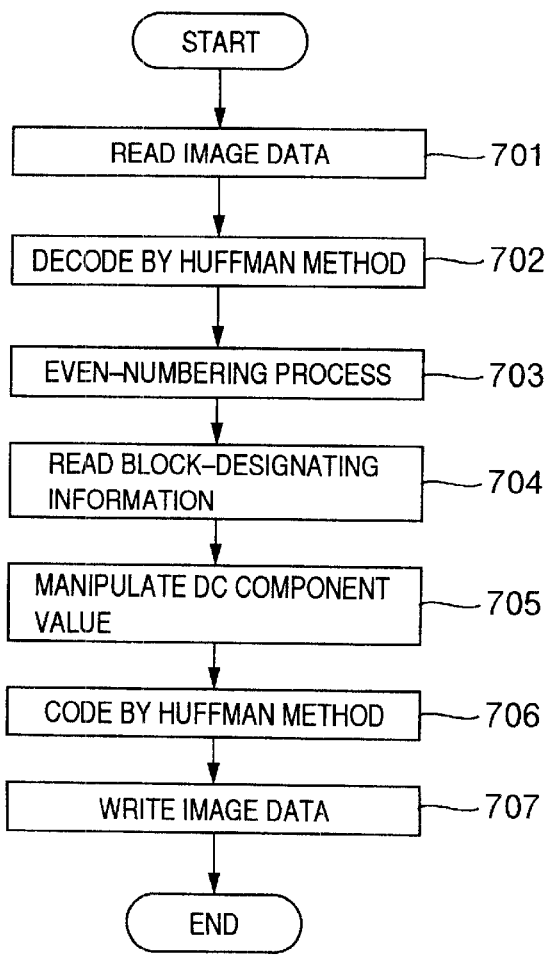
FIG. 7A is a flowchart showing a third example of the processing operation in an image data manipulation method according to the invention.

FIG. 7A is a flowchart showing a third example of the processing operation in an image manipulation method according to the present invention.

The flow of the whole procedure shown in FIG. 7A is the same as the corresponding procedure shown in FIG. 1 but has a different portion in the process of each step.

In step 701, the image data to be manipulated is read from the external storage unit 23 of FIG. 2, and by analyzing the format thereof, stored in the main memory 24b. This process is executed according to the JFIF specification.

In step 702, the image data stored in the main memory 24b is decoded by Huffman method thereby to obtain the value for each block. For each block of which the DC component value is expressed by the difference with the DC component value of an adjoining block, the DC component value is converted into an expression using a real value and decoded in step 702. This process is executed according to the JFIF specification.

The luminance information of the block decoded by Huffman method in step 702 as described above constitutes the information including an integral value expressed as an 8×8 matrix table as shown in FIG. 3.

Figure 7B:
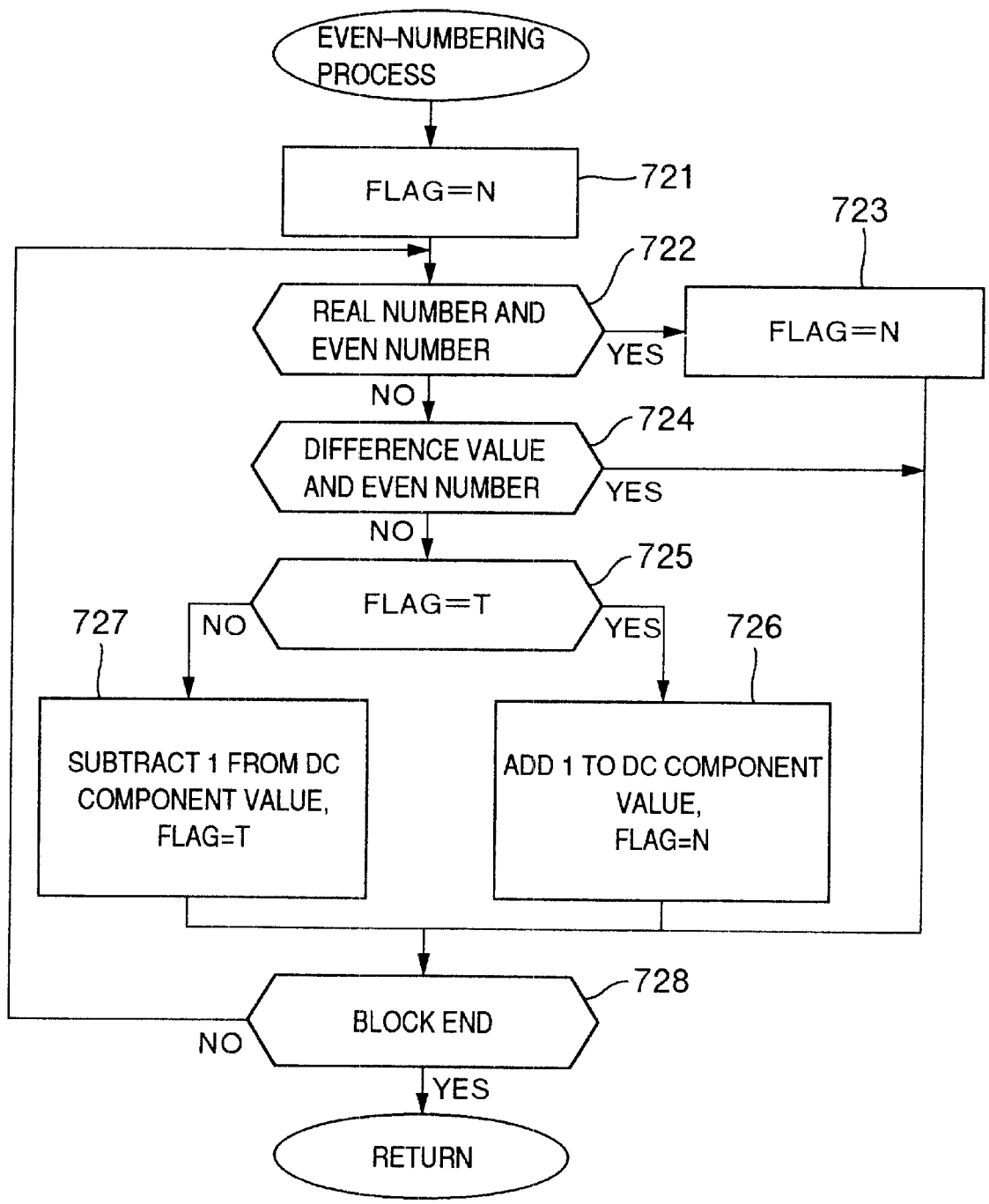
FIG. 7B is a flowchart showing an even-numbering process according to an embodiment.

In step 703, the image data stored in the main memory 24b are converted into even numbers. The flow of this even-numbering process is shown in FIG. 7B.

In the even-numbering process, a variable FLAG is used and has a value of T or N. The initial value of the variable FLAG is assumed to be N (step 721). Subsequently, according to the sequence of the blocks, the process of (1) to (3) described below is performed for the DC component value of each block so that the DC component value of each block is even-numbered.

(1) It is determined whether the DC component value is expressed by a real value and is an even number (step 722), and if an even number, the flag is set to the value of N (step 723).

(2) In the case where the DC component value is an even number expressed as the difference with the DC component value of an adjoining block, nothing is done (step 724).

(3) In the case where neither (1) or (2) above applies, it is determined whether the flag value is T or not (step 725), and if the flag value is T, step 3-1 is executed, while if the flag value is N, step 3-2 is executed.

(3-1) The value 1 is added to the DC component value and the flag value is set to N (step 726).

(3-2) the value 1 is subtracted from the DC component value, and the flag value is set to N (step 727).

The foregoing process is repeated for each block so that the DC component value can be converted into an even number while at the same time preventing the accumulation of errors caused by the even-numbering process.

In this case, the even-numbering process is inserted after step 702 for Huffman decode process. As an alternative, the even-numbering process can be executed at the same time as the Huffman decoding process.

In the case where the image data read in step 701 is the one in which the DC component value thereof is even-numbered in advance, no the even-numbering process of step 703 can be done.

Then, in step 704 of FIG. 7A, the information designating the blocks to be manipulated is read from the external storage unit 23 shown in FIG. 2. This information includes a bit string arranged in the same order as the blocks, the bits including "1" designating the blocks to be manipulated and "0" indicating the blocks not to be manipulated. In the example shown in FIG. 4, the bit string is "101010101". This process is the same as that in step 103 shown in FIG. 1.

In step 705, the DC component value of each block to be manipulated designated based on the information read in step 704 is manipulated as described in (d) to (g) below. The operation of the process (d) to (f) is substantially the same as the operation of (a) to (c) in step 104.

(d) First, in the case where the DC component value of the block to be manipulated (the information 121 in FIG. 3) is not less than a threshold value A or less than a threshold value B (B<A), the DC component value is multiplied by "−1" thereby to reverse the plus and minus signs.

(e) In the case where the DC component value is less than the threshold value A and not less than the threshold value C (B<C<A), a predetermined value D is subtracted from the DC component value.

(f) In the case where the DC component value is less than the threshold value C and not less than the threshold value B, the predetermined value D is added to the DC component value.

(g) Further, in order to show that a value is determined after taking the manipulation into account, "1" is added to the value obtained as the result of the manipulation described above. Specifically, the DC component value is adjusted to an even number in advance, and therefore the even-number value with the least significant bit of "0" is a bit value not manipulated, and the odd-number value with the least significant bit of "1" is a bit value manipulated.

Assume that the value of the threshold C is set to "0", and the difference between the threshold value A and the threshold value C, the difference between the threshold value C and the threshold value B and the value D are set equal to each other. Then, the value after conversion can be inversely converted.

Now, an explanation will be given of a specific case in which the threshold value A is set to "128", the threshold value B is set to "−128", the threshold value C is set to "0", and the value D is set to "128".

Assuming that the DC component value is "200", the case (d) described above is involved, and therefore the DC component value is converted to "−199". In other words, "1" is added to the value of the manipulation result of (200)×(−1)=−200 and thus the DC component value is converted into "−199".

In similar fashion, in the case where the DC component value is "120", the case (e) is involved and therefore the DC component value is converted into "−7"(=120−128+1). Also in the case where the DC component value is "16", the case (e) is involved, and therefore the DC component value is converted into "−111" by a similar calculation. In the case where the DC component value is "0", the case (e) is involved and therefore the DC component value is converted into "−127" by a similar calculation. In the case where the DC component value is "−10", the case (f) is involved, and therefore the DC component value is converted into "119" (=−10+128+1). Also in the case where the DC component value is "−110", the case (f) is involved and therefore the DC component value is converted into "19" by a similar calculation. In the case where the DC component value is "−200", the case (d) is involved and therefore the DC component value is converted into "201"(=(−200)×(−1)+1=201).

By these operations, all the DC component values to be manipulated are converted into odd numbers which have the least significant bit of "1" and each of which is changed at least by 127 from the original value thereof. As a result, in the case where the reference luminance of the block to be manipulated is approximate to the reference luminance of the surrounding blocks, the aforementioned operation causes the reference luminance of the block manipulated to deviate from that of the surrounding blocks considerably. If the particular block is displayed as it is, therefore, the operation performed for changing the image data is easily found.

Then, in step 707 shown in FIG. 7A, the data converted is subjected to Huffman coding. In the process, the blocks of which the value has been expressed by the difference are converted into an expression by a real value and then subjected to Huffman coding.

The image data stored in the main memory 24b in step 701 and processed in step 706 with the corresponding portion thereof rewritten is stored in the external storage unit 23 in step 707.

As the result of the foregoing process, the manipulation of the image data is completed, and the image data thus manipulated are recorded in the external storage unit 23 or the optical disk 25 shown in FIG. 2. Also, the same data can be transmitted to other computer systems through the internet or the LAN.

Now, the operation of restoring the image data is explained, in which the image data manipulated through the procedure described above and recorded in the optical disk 25 or transmitted through the communication unit 27 are displayed by the computer system having the configuration shown in FIG. 6.

Figure 8:
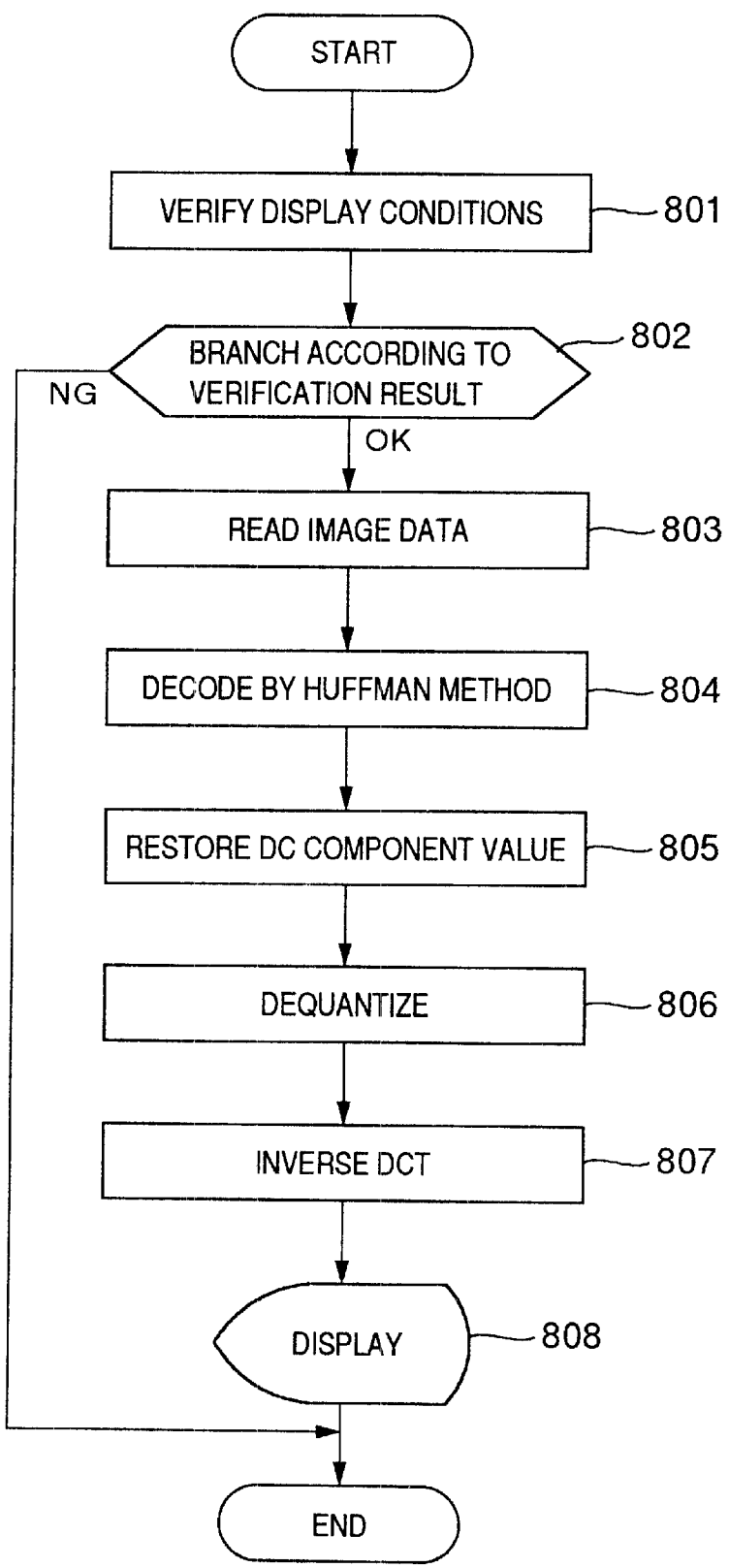
FIG. 8 is a flowchart showing a fourth example of the processing operation in an image data manipulation method according to the invention.

FIG. 8 is a flowchart showing a fourth example of the processing operation in an image data manipulation method according to the invention.

The flow of the whole processing steps shown in FIG. 8 is the same as that shown in FIG. 5, but each step is partly different.

In step 801, like step 501, the display conditions are verified by determining whether the information indicating that the user is permitted to display is recorded or not in the external storage unit 63, by the response from a device for responding whether a predetermined amount is paid or not, or by determining whether the display conditions buried as an electronic watermark in the image are satisfied or not.

In step 802, the process is branched in accordance with the result of the verification in step 801. Specifically, in the case where the verification is successful in step 801, the process proceeds to the restoration operation of step 803, and in the case where the verification fails in step 801, the process is terminated. In the case where the verification fails in step 801, the image data manipulated in the process of FIG. 7A may not be restored but displayed as an image as it is.

In step 803, the image data to be restored is read from the external storage unit 63 of FIG. 6, for example, and after the format thereof is analyzed, recorded in the main memory 64b.

In step 804, the image data recorded in the main memory 64b is decoded by Huffman method and the value is obtained for each block.

In step 804, like the process of step 504 in FIG. 5 and step 102 in FIG. 1, each block having a DC component value expressed as the difference with the DC component value of an adjoining block is converted into an expression with a real value.

These processes are specifically implemented based on the JFIF specification.

Also, the luminance information of the blocks subjected to Huffman decoding in step 804 is composed of the integral values expressed as an 8×8 matrix table as shown in FIG. 3.

In step 805, the DC component value is restored for each block in the manner shown in (d') to (g') below based on the information designating the blocks to be manipulated as indicated by the least significant bit of the DC component value. In this case, the restoration operation is performed on the DC component value of the blocks of which the least significant bit is "1".

(g') First, "1" is subtracted from the DC component value (the information 121 in FIG. 3) of the blocks to be manipulated.

(d') Then, in the case where the DC component value of the block to be manipulated is not less than a threshold value A or less than a threshold value B (B<A), the DC component value is multiplied by "−1" thereby to reverse the plus and minus sign.

(e') In the case where the DC component value is less than the threshold value A and not less than a threshold value C (B<C<A), a predetermined value D is subtracted from the DC component value.

(f') In the case where the DC component value is less than the threshold value C and not less than the threshold value B, the predetermined value D is added to the DC component value.

Each manipulation of (d'), (e'), (f') described above is identical to the manipulation of (d), (e), (f), respectively, in step 705 of FIG. 7A. By setting the same threshold values A, B, C, D as in step 705, the operation inverse to the process of step 705 is accomplished, thereby making it possible to restore the original DC component value.

Specifically, the data meeting the condition (e') meets the condition (f) before the process of step 705 in FIG. 7A, while the data meeting the condition (f') meets the condition (e) before step 705.

In step 806, the dequantization is effected, so that the inverse DCT is carried out in step 807. The detail of these processes is based on the JFIF specification.

The value of each pixel of the image information can be produced by the aforementioned process.

In step 808, the image is displayed on the display unit 61 of FIG. 6 using the value of each pixel thus obtained. This image is already restored to the original image.

Figure 9:
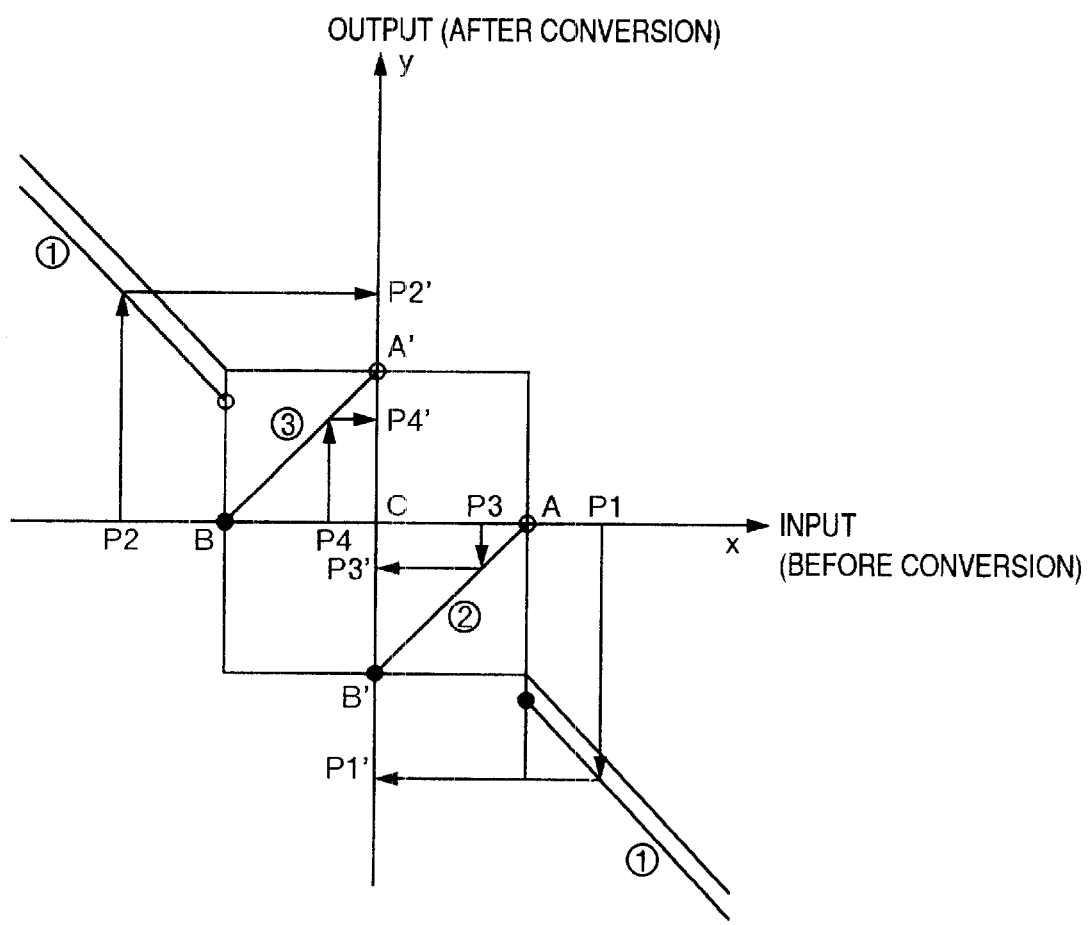
FIG. 9 is a diagram for explaining an example of the procedure for converting the image data in an image data manipulation method according to the invention.

FIG. 9 is a diagram for explaining an example of the procedure for converting the image data by an image data manipulation method according to the invention.

In FIG. 9, the manner in which the conversion is carried out for each of the threshold values A, B and C (B<C<A) is shown in the form of a graph with the x axis representing the value of the input before scramble and the y axis representing the output value after scramble.

The input value "P1" not less than the threshold value A and the input value "P2" less than the threshold value B, for example, are converted into the output values of "P1'" and "P2'", respectively, as indicated by arrows based on the linear equation of ① "y=−x−1". The input value "P3" not less than the threshold value C but less than the threshold value A, on the other hand, is converted into the output value of "P3''" based on the equation of ② "y=x−A". Also, the input value "P4" less than the threshold value C but not less than the threshold value B is converted into the output value of "P4'" based on the equation of ③ "y=x−B". The manipulation reverse to that indicated by arrows in FIG. 9 makes up the restoration operation, where the value at point A' is −B and the value at point B' is −A. Also, the scramble effect can be changed by changing the inclination of the straight line.

As described above with reference to FIGS. 1 to 9 above, with an image data manipulation method according to this embodiment, the luminance information of the image data managed in a format obtained by segmenting the image data into a plurality of rectangular areas (blocks) of a predetermined size according to JPEG or the like is changed for each designated block by a computer, and at the same time the information (ID information) is attached for identifying the blocks changed. Exactly the same process can be performed also on the color information. This process thus can be performed for both the luminance information and the color information.

The information for identifying the color information also indicates whether a given block has been changed according to a predetermined bit value of the DC component thereof (with the least significant bit of "1" in this case) or according to the header information of the data format. The blocks specified by the ID information as the changed blocks are converted in the way reverse to the change process thereby to restore the image data.

In this way, the manner in which the image data are displayed is changed for each block. Therefore, the area for which the manner of display is changed can be limited to a specified block, thereby reducing the amount of the change manipulation process while making it possible to combine with the image data manipulation technique such as the electronic watermarking. In this embodiment, for example, the image data is manipulated by changing the DC component value of at least one of the luminance component and the color component without changing the AC component, for which the electronic watermarking is possible.

Also, assuming that the procedure is employed for restoring the image data after verification of the display conditions, the image data is displayed without restoration or nothing is displayed unless the display conditions are met. As a result, the operator can easily determine whether the verification of the display conditions has been correctly carried out or not from the state (normal or abnormal) of the image on display. Also, the image browser can be informed that a predetermined restoration process is required for displaying the image data received through the internet, with a WWW (World Wide Web) browser or the like.

This invention is not limited to the examples described above with reference to FIGS. 1 to 9 and is modifiable without departing from the scope and spirit thereof. This embodiment, for example, refers to the case in which an image data manipulation method according to the invention is applied to the JFIF image data and the case in which the DC component value of the luminance distribution of each JFIF block is manipulated. The image data manipulation method according to this invention, however, is also applicable to the image data of the MEPG (Moving Picture Expert Group) format other than JFIF. Also, the DC component value of the difference between the luminance and the blue level (Cb) or the difference (Cr) between the luminance and red level.

Further, this embodiment is so configured that the processing program for the image data manipulation method according to the invention is installed from the optical disk. The same program, however, can alternatively be downloaded and installed from the FD (Flexible Disk) or such a recording medium as a semiconductor memory or a magneto-optic disk, or it can be downloaded from other computer systems through a communication unit.

Also, according to this embodiment, a computer system for carrying out the manipulation for image data change has a configuration including the display unit 21 and the communication unit 27 as shown in FIG. 2. Nevertheless, unless required for the specific operations, the display unit 21 and the communication unit 27 may be done without.

The present invention is not limited to the aforementioned embodiments and includes a variety of modifications within the scope of the claims.

We claim:

1. An image data manipulation method in which an image is segmented into a plurality of blocks each including a predetermined number of pixels in each of vertical and horizontal directions and the image data described by the discrete cosine transform of the luminance information and the color information is changed using a computer having a central processing unit and a storage unit, comprising the steps of:

changing the a DC component value of at least one of said luminance information and said color information for each predetermined block to a value different by at least a predetermined value from the original value attaching ID information for identifying the block which has its image data manipulated to said block; and wherein said step of changing said DC component value includes the substep of inverting the sign of the value P of said image data and then subtracting a predetermind value E in the case were said value P is not less than a threshold value A or less than a threshold value B, the substep of subtracting a predetermined value D from said value P in the case where said value P is less than the threshold value A and not less than the threshold value C, and the substep of adding the predetermined value D to said value P in the case where said value P is less than the threshold value c and not less than the threshold values B, where the relation holds that B<C<A, C=0, E=1 and A−C=C−B=D.

2. An image data manipulation method in which an image is segmented into a plurality of blocks each including a predetermined number of pixels in each of vertical and horizontal directions and the image data described by discrete cosine transform of the luminance information and the color information is changed using a computer having a central processing unit and a storage unit, comprising the step of:

changing the a DC component value of at least one of said luminance information and said color information for each predetermined block to a value different by at least a predetermined value from the original value attaching ID information for identifying the block which has its image data manipulated to said block; and wherein said step of changing said DC component value includes the substep of inverting the sign of the value P of said image data in the case where said value P is not less than a threshold values A or less than threshold value B, the substep of subtracting a predetermined value D from said value P in the case where said value P is less than the threshold value A and not less than the threshold value C, and the substep of adding the predetermined value D to said value P in the case where said value P is less than the threshold value C and not less than the threshold values B, where the relation holds that B<C<A, C=0, and A−C=C−B=D.

3. An image data manipulation method according to claim 2, further comprising the step of making said DC component value of an even number before said step of changing said DC component value.

4. An image data manipulation method according to claim 3, wherein said step of changing said DC component value includes the substep of adding 1 to the value obtained.

5. An image data manipulation method in which an image is segmented into a plurality of blocks each including a predetermined number of pixels in each of vertical and horizontal directions and the image data described by the discrete cosine transform of the luminance information and the color information is changed using a computer having a central processing unit and a storage unit, comprising the steps of:

discriminating a manipulated block based on ID information;

manipulating said manipulated block reversely to the manipulation used for changing said block thereby to restore the original image data; and wherein said step of restoring said image data includes the substep of inverting the sign of the value P of said image data and then subtracting a predetermined value E in the case were said value P is not less than a threshold value A or less than a threshold value B, the, the substep of subtracting a predetermined value D from said value P in the case where said value P is less than the threshold value A and not less than threshold value C, and the substep of adding the predetermined value D to said value P in the case where said value P is less than the threshold value C and not less than the threshold value B, where the relation holds that B<C<A, C=0, E=1 and A−C=C−B=D.

6. An image data manipulation method in which an image is segmented into a plurality of blocks each including a predetermined number of pixels in each of vertical and horizontal directions and the image data described by the discrete cosine transform of the luminance information and the color information is changed using a computer having a central processing unit and a storage unit, comprising the steps of:

discriminating a manipulated block based on ID information;

manipulating said manipulated block reversely to the manipulation used for changing said block thereby to restore the original image data; and wherein said step of restoring said image data includes the substep of inverting the sign of the value P of said image data in the case where said value P is not less than a threshold value A or less than a threshold value B, the substep of subtracting a predetermined value D from said value P in the case where said value P is less than the threshold value A and not less than the threshold value C and the substep of a adding the predetermined value D to said value P in the case where said value P is less than the threshold value C and not less than the threshold value B, where the relation holds that B<C<A, C=0, and A−C=C−B=D.

7. An image data manipulation method according to claim 6, further comprising the step of subtracting by 1 from said DC component value of said manipulated block before said step of restoring said image data.

* * * * *